United States Patent [19]

Sample

[11] 3,775,665

[45] Nov. 27, 1973

[54] APPARATUS FOR GENERATING AN ELECTRICAL OUTPUT SIGNAL OF VARIABLE FREQUENCY

[75] Inventor: Peter Sample, Bracknell, England

[73] Assignee: The Solartron Electronic Group Limited

[22] Filed: Nov. 8, 1972

[21] Appl. No.: 304,869

[52] U.S. Cl. .................................... 321/61, 331/40
[51] Int. Cl. .............................................. H02m 5/00
[58] Field of Search .................. 321/9, 60, 61, 69 R; 331/40, 47, 48

[56] References Cited

UNITED STATES PATENTS

| | | | |
|---|---|---|---|
| 2,918,618 | 12/1959 | McKenney et al. | 321/61 X |
| 3,144,623 | 8/1964 | Steiner | 321/69 R |
| 3,170,107 | 2/1965 | Jessee | 321/61 |
| 3,246,231 | 4/1966 | Clarke | 321/61 X |
| 3,320,546 | 5/1967 | Allen et al. | 331/40 X |
| 3,694,766 | 9/1972 | Boelke | 331/40 X |

*Primary Examiner*—William M. Shoop, Jr.
*Attorney*—William R. Sherman et al.

[57] ABSTRACT

The invention provides a frequency generator capable of producing an output frequency which is continuously variable but which is nevertheless phase-locked to a stable reference frequency. The output frequency is derived from a V.C.O., and is sampled at the reference frequency to produce a difference frequency equal to the difference between the output frequency and a harmonic of the reference frequency. This difference frequency is maintained equal to another reference frequency, lower than the first, by comparison with this other reference frequency in a phase-sensitive detector, whose output is applied to the V.C.O. to complete a phase-locked loop.

The first reference frequency is produced by mixing the outputs of two variable-frequency crystal-controlled oscillators, one of which is manually adjustable and the other of which is controlled by a control circuit. It is arranged that while the output frequency of the V.C.O. is being coarsely manually adjusted, the phase-locked loop is disabled and the control circuit adjusts the frequency of its crystal-controlled oscillator to maintain the difference frequency substantially equal to the other reference frequency. After coarse adjustment, therefore when the phase-locked loop is re-enabled it is already almost in lock. The output frequency is then finely adjusted by manual adjustment of the frequency of the other crystal-controlled oscillator.

23 Claims, 2 Drawing Figures

FIG. 1

PATENTED NOV 27 1973 3,775,665

SHEET 2 OF 2

APPARATUS FOR GENERATING AN ELECTRICAL OUTPUT SIGNAL OF VARIABLE FREQUENCY

Figure 1:
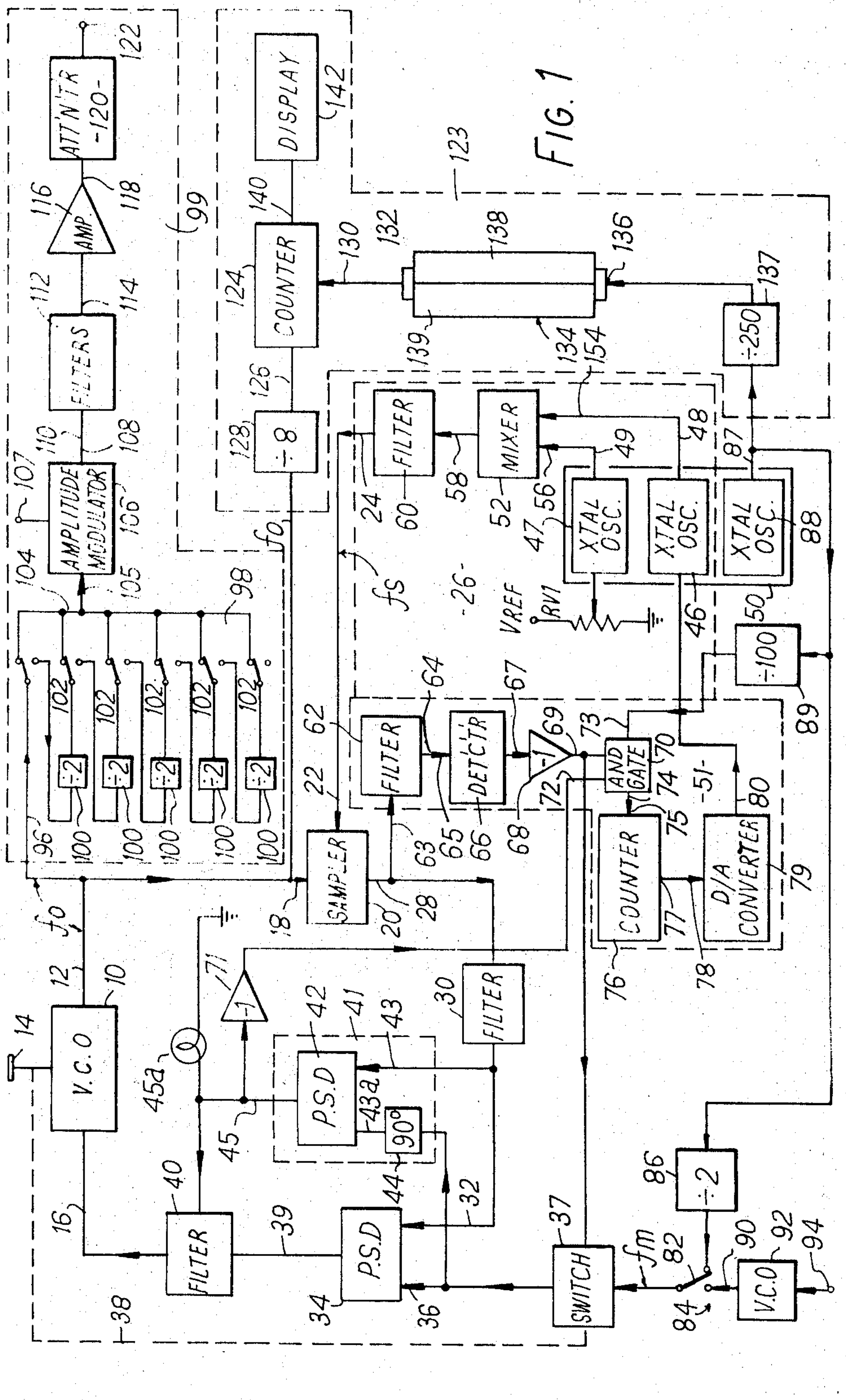

This invention relates to apparatus for generating an electrical output signal of variable frequency.

One known type of apparatus for generating an electrical output signal of variable frequency comprises a variable inductive or capacitative oscillator circuit such as a Wien bridge oscillator. This type of apparatus is relatively inexpensive and can produce a continuously variable output frequency, but the accuracy and stability of the frequency of the output signal are not very closely controllable. Another known type of such apparatus is the frequency synthesizer, in which the variable output frequency is derived from an internal reference frequency, typically by subtracting selectable submultiples of the reference frequency from the reference frequency itself. The accuracy and stability of the frequency of the output signal from this type of apparatus are closely controllable, but the output frequency is stepwisely or discretely variable, and the apparatus is relatively expensive. It is an object of the present invention to provide a novel type of apparatus for generating an electrical output signal of variable frequency, in which the frequency of the output signal is related to an internal reference frequency, but which is simpler and less expensive than the more complex frequency synthesizers, is capable of producing a continuously variable output frequency, and is convenient to use.

According to the present invention, there is provided apparatus for generating an electrical output signal of variable frequency, the apparatus comprising: first oscillator means for generating a first frequency from which the output signal is derived; means for varying the first frequency to select approximately a desired value thereof; second oscillator means for generating a second frequency lower than the first frequency; circuit means connected to receive the first and second frequencies and arranged to produce a frequency equal to the difference between the first frequency and a harmonic of the second frequency; phase-sensitive detector means arranged to compare the frequency produced by the circuit means with a third frequency and to produce a control signal dependent upon the difference therebetween; means for applying the control signal to the first oscillator means to vary the first frequency, so as to maintain the frequency produced by the circuit means substantially equal to the third frequency, and thereby phase-lock the first frequency to the second and third frequencies; and means for varying the second frequency to select said desired value of the first frequency, the means for varying the second frequency being arranged to render the first frequency continuously variable and including control means operative, in response to a predetermined difference between the frequency produced by the circuit means and the third frequency, to produce a further control signal which is applied to the second oscillator means to vary the second frequency so as to reduce said difference.

Thus the first frequency is first coarsely varied to approximately the desired value, which effectively selects, for a fixed value of the third frequency, the particular harmonic of the second frequency to which the first frequency phase-locks. The second frequency is then varied so as to finely adjust the first frequency exactly to the desired value. The control means ensures that when the coarse variation of the first frequency has been completed, the phase-locked loop which includes the first oscillation means, the circuit means and the phase-sensitive detector means is close to a locked condition.

The invention will now be described, by way of non-limitative example only, with reference to FIGS. 1 and 2 of the accompanying drawings, which show two different embodiments of apparatus in accordance with the present invention, for generating an electrical output signal of variable frequency.

The apparatus shown in FIG. 1 comprises a voltage-controlled oscillator 10, having an output 12 and manual adjusting means 14 whereby the output frequency, $f_o$, of the oscillator may be adjusted over a frequency range of, typically, 256 – 512 MHz. The oscillator 10 also has a control input 16, and may comprise for example a varactor-controlled transmission line oscillator or a voltage- or current-controlled multivibrator circuit.

The output 12 of the oscillator 10 is connected to the sampling input 18 of a sampling circuit 20, which has a gate input 22 connected to the output 24 of a sampling frequency source 26 having an operating frequency $f_s$. The sampling circuit 20 also has an output 28, at which it produces an output signal composed of samples of the signal at the input 18 taken at the operating frequency of the sampling frequency source 26. The sampling circuit 20 may, for example, include a normally reverse-biassed Schottky diode (not shown), which is connected between the sampling input 18 and the output 28 and which is arranged to be rendered conductive for a very short time, typically 0.5 nsecs, either by a transistor (not shown) operating in the avalanche mode, or by a step-recovery diode (not shown): the transistor or step-recovery diode is in turn driven by the signal at the gate input 22.

The output 28 of the sampling circuit 20 is connected, via a low pass filter 30 whose pass-band typically extends to just above 500kHz, to one input 32 of a two-input phase-sensitive detector 34. The other input 36 of the phase-sensitive detector 34 is connected, via a normally-closed switching device 37, to receive an auxilliary frequency $f_m$, typically 500 kHz, as will hereinafter be described. The switching device 37 is operatively connected, by means of a linkage shown diagrammatically at 38, to the manual adjusting means 14, in such a manner that the switching device 37 is opened during adjustment of the manual adjusting means 14. This can be achieved, for example, by arranging the manual adjusting means as a rotatable control or knob, and by further arranging that the control or knob can only be rotated if it is simultaneously pushed-in or pulled-out: the pushing-in or pulling-out can then be arranged directly or indirectly to effect the opening of an electromechanical switch in the switching device 37.

The output 39 of the phase-sensitive detector 34 is connected, via a variable low-pass filter 40, to the control input 16 of the oscillator 10.

A lock detector 41 is connected in parallel with the phase-sensitive detector 34, and comprises a further two-input phase-sensitive detector 42. The input 32 of the phase-sensitive detector 34 is connected to one input 43 of the phase-sensitive detector 42, while the input 36 of the phase-sensitive detector 34 is connected, via a 90° phase-shift network 44, to the other input 43$a$ of the phase-sensitive detector 42. The phase-sensitive detector 42 therefore produces an output (or "lock-indication") signal at its output 45 when the respective signals at the inputs 32, 36 of the phase-sensitive detector 34 are in phase and equal in frequency. The output 45 of the phase-sensitive detector 42 is connected to an indicator lamp 45*a*.

The output 45 of the phase-sensitive detector 42 is also operatively connected to the variable low-pass filter 40, so as to adjust the pass-band thereof. Thus the filter 40 may for example comprise a simple RC filter, and the lock-indication signal at the output 45 may be arranged to close an FET switch which switches an additional capacitor in parallel with the basic capacitor (and/or switches an additional resistor in series with the basic resistor), so as to reduce the upper pass frequency of the filter 40.

The sampling frequency source 26 comprises first and second crystal-controlled oscillators 46, 47, which have respective outputs 48, 49 and which are both mounted in a temperature-controlled oven 50. The temperature of the oven 50 is controlled to within ± 1°C, so that the respective accuracies of the frequencies of the oscillators 46, 47 are controllable to better than one part in $10^6$. The operating frequency of the oscillator 46 is variable, about a typical nominal value of 16 MHz, under the influence of a control circuit 51 which applies a variable control voltage to a varactor (not shown) associated with the oscillator 46. The operating frequency of the oscillator 47 is also variable, about a typical nominal value of 18 MHZ, by means of a variable resistor RV1, which is arranged to adjust the voltage applied to another varactor (not shown) associated with the oscillator 47. A mixer 52 has two inputs 54, 56 respectively connected to the outputs 48, 49, and an output 58 connected to a low-pass filter 60 whose pass-band extends to just above 2MHz. The output of the filter 60 constitutes the output 24 of the sampling frequency source 26. The output frequency $f_s$ of the sampling frequency source 26 thus has a nominal value of 2 MHz, and can be manually adjusted by means of RV1.

The control circuit 51 comprises a filter 62, whose input 63 is connected to the output 28 of the sampling circuit 20 and whose output 64 is connected to the input 65 of a detector 66. The filter 62 has a pass-band centered on the auxilliary frequency $f_m$, typically 500 ± 25 KHz, and the detector 66, which may comprise a diode (not shown) arranged to charge a capacitor (not shown), produces an output signal at its output 67 when the frequency at the output 28 of the sampling circuit 20 lies within this pass-band. The output 67 of the detector 66 is connected, via an inverter 68, to one input 69 of a three-input AND gate 70. The input 69 of the AND gate 70 is also connected to the switching device 37. The output 45 of the phase-sensitive detector 42 is connected, via another inverter 71, to the second input 72 of the AND gate 70, while the third input 73 of the AND gate 70 is connected to receive clock pulses, as will hereinafter be described, at a typical frequency of 10KHz.

The output 74 of the AND gate 70 is connected to the count input 75 of a counter 76. The counter 76 may typically comprise three decades, and has an output 77 connected to the input 78 of a digital-to-analogue converter 79 which produces at its output 80 an analogue output voltage proportional to the count in the counter 76. The digital-to-analogue converter may, for example, comprise a plurality of binary-weighted resistors connected from the various stages of each decade of the counter 76 to a common summing point. The analogue voltage at the output 80 of the digital-to-analogue converter 79 constitutes the control voltage which is applied to the oscillator 46.

The auxilliary frequency $f_m$ is applied to the input 36 of the phase-sensitive detector 34 via the wiper 82 of a two-position switch 84. In the illustrated position of the switch 84, the frequency $f_m$ is derived from the output of a divide-by-two bistable circuit 86, which is connected to the output 87 of a third crystal-controlled oscillator 88. The output 87 of the oscillator 88 is also connected, via a divide-by-one-hundred circuit 89, to the input 73 of the AND gate 70. The oscillator 88 has a fixed operating frequency, typically 1 MHz, and is also mounted in the oven 50. In this case, therefore, $f_m$ is accurately related to the operating frequency of the oscillator 88. However, in the other position of the switch 84, the auxilliary frequency $f_m$ is derived from the output 90 of a voltage-controlled oscillator 92 set to free-run at a frequency of 500 KHz. The oscillator 92 may be a voltage-controlled multivibrator circuit, and has a control input 94 to which a variable control signal may be applied in order to frequency-modulate $f_m$. This frequency modulation of $f_m$ is transferred directly to the output 12 of the oscillator 10, i.e. to $f_o$, as will hereinafter become apparent.

The output 12 of the oscillator 10 is further connected to the input 96 of an adjustable divider circuit 98, which forms part of an output circuit 99 and which comprises five bistable dividing circuits 100 connected in cascade, and six change-over switches, shown diagrammatically at 102, for selectively connecting the input 96 or the output of any one of the bistable circuits 100 to the output 104 of the divider circuit 98. The divider circuit 98 thus selects, from the output of the oscillator 10, output signals whose frequencies lie in the ranges 256–512 MHz, 128–256 MHz, 64–128MHz, 32–64 MHz, 16–32 MHz and 8–16 MHz. The change-over switches 102 are arranged to ensure that when a particular range is selected, the bistables 100 corresponding to all ranges lower than the selected range are switched off: this reduces contamination of the output frequency by subharmonics thereof.

The output 104 of the divider circuit 98 is connected to one input 105 of an amplitude modulator 106, which has a control input 107 whereby the output signal may be amplitude modulated if desired. The output 108 of the amplitude modulator 106 is connected to the input 110 of a filter circuit 112, which comprises a plurality of half-octave low-pass filters (not shown) individually selectable, by switching means (not shown) ganged with the switches 102. The respective pass-bands of the filters extend to successively lower frequencies, corresponding to successively lower frequency ranges selected by the divider circuit 98, and thus remove any higher harmonics present in the output signal and render it substantially sinusoidal. The output 114 of the filter circuit 112 is connected, via an output buffer amplifier 116, to the input 118 of a variable attenuator 120, whereby the amplitude of the output signal may be varied as desired, typically by 0–139 dB. The output 122 of the attenuator 120 constitutes the output of the apparatus.

The apparatus also includes a display circuit 123 for measuring and displaying the frequency of the output signal, comprising a digital counter 124 having a count input 126 to which the output 12 of the oscillator 10 is connected via a divide-by-eight circuit 128. The digital counter 124 also has a time-base input 130 which is connected to the output 132 of a further adjustable divider circuit 134. The divider circuit 134 has an input 136 to which the output 87 of the oscillator 88 is connected via a divide-by-two-hundred-and-fifty circuit 137, and again comprises five bistable dividing circuits 138 connected in cascade and six change-over switches 139 for selectively connecting the input 136 or the output of any one of the bistable circuits 138 to the output 132. The switches 139 are also ganged with the switches 102, and adjust the division ratio of the circuit 134 between $2^5$, $2^4$, $2^3$, $2^2$, $2^1$ and $2^0$ respectively for successively lower frequency ranges. The divider circuit 134 therefore adjusts the gate period of the counter 124, i.e. the duration of the intervals in which pulses at the count input 126 are counted, between 8msec, 4msec, 2msec, 1msec, 0.5msec and 0.25msec. The output 140 of the counter 124 is connected to a six-digit display unit 142, which displays the count accumulated in the counter 124 during each gate period.

In operation, the desired output frequency range is selected by means of the switches 102, and the output frequency $f_o$ of the oscillator 10 is adjusted by means of the manual adjusting means 14 until the display unit 142 displays a frequency approximately equal to the desired output frequency. As already mentioned, during adjustment of the manual adjusting means 14 the switching device 37 is opened, thus removing the auxilliary frequency $f_m$ from the input 36 of the phase-sensitive detector 34 and thereby disabling the phase-locked loop comprising the oscillator 10, the sampling circuit 20 and the phase-sensitive detector 34. Since the action of the phase-locked loop, as will be shown hereinafter, permits only discrete values of $f_o$ for fixed values of $f_s$ and $f_m$, this disablement of the phase-locked loop permits $f_o$, and therefore the output frequency, to be continuously varied, or swept through a continuous range of values, by means of the manual adjusting means 14.

While the phase-locked loop is disabled, the absence of a lock-indication signal at the output 45 of the phase-sensitive detector 42 is operative, via the inverter 71, to enable the input 72 of the AND gate 70. If the frequency of the signal at the output 28 of the sampling circuit 20 does not lie within the pass-band of the filter 62, the detector 66 enables the input 69 of the AND gate 70 and ensures that the switching device 37 remains open. The AND gate 70 therefore permits clock pulses to be supplied to the counter 76, thus causing the digital-to-analogue converter 79 to generate a control voltage of "staircase" form which is applied to the oscillator 46. The operating frequency of the oscillator 46 is thus varied, which in turn varies $f_s$, until the frequency of the signal at the output 28 of the sampling circuit 20 falls within the pass-band of the filter 62. At this point, the detector 66 disables the input 69 of the AND gate 70, thereby preventing the supply of clock pulses to the counter 76, and permits the switching device 37 to close.

The control circuit 51, the sampling frequency source 26 and the sampling circuit 20 therefore form another closed loop, whose purpose is to ensure that, as $f_o$ is varied by the manual adjusting means 14, $f_s$ is automatically and simultaneously varied so as to maintain the frequency of the signal at the output 28 of the sampling circuit 20 substantially equal to $f_m$ (to within the limits set by the pass-band of the filter 62). Thus when adjustment of the manual adjusting means 14 is completed and the switching device 37 closes to enable the phase-locked loop comprising the oscillator 10, the sampling circuit 20 and the phase-sensitive detector 34, the phase-locked loop is already very close to lock.

When the switching device 37 closes, the frequency of the signal at the output 28 of the sampling circuit 20 is compared with the auxilliary frequency $f_m$ by the phase-sensitive detector 34. The phase-sensitive detector 34 produces at its output 38 a control signal dependent on the difference between the respective frequencies at its inputs 32, 36, and this control signal is applied to the control input 16 of the oscillator 10 so as to finely adjust the output frequency $f_o$ until the respective frequencies at the inputs 32, 36 of the phase-sensitive detector 34 are equal. The frequency of the signal at the output 28 of the sampling circuit 20 is $f_o - nf_s$, where $n$ is the harmonic multiplication factor of the sampling circuit 20, so at this point $$f_o - nf_s = \pm f_m \quad (1)$$

(since $f_o$ may be greater or less than $nf_s$), which gives $$f_o = nf_s \pm f_m \quad (2)$$

Thus the output frequency $f_o$ of the oscillator 10 is phase-locked to an harmonic of the sampling frequency $f_s$ and to the auxilliary frequency $f_m$. Once the value of the auxilliary frequency $f_m$ has been chosen, therefore, the particular harmonic of the sampling frequency $f_s$ to which the output frequency $f_o$ locks is principally determined by the value of $f_o$ set by the manual adjusting means 14. It will also be appreciated from equation (2) that for fixed values of $f_s$ and $f_m$, only discrete values of $f_o$ are possible.

When the output frequency $f_o$ of the oscillator 10 is locked, the phase-sensitive detector 42 in the lock detector 41 produces an output signal which energises the indicator lamp **45*a*, and simultaneously disables the input 72 of the AND gate 70 and reduces the upper pass frequency of the filter 40. This reduction in the pass-band of the filter 40 effectively reduces the closed-loop band width of the phase-locked loop, while the disablement of the input 72 of the AND gate 70 ensures that the count in the counter 75, and therefore the control voltage applied to the oscillator 46**, cannot change.

The output frequency of the apparatus is then finely adjusted to the desired value by varying the sampling frequency $f_s$ by means of RV1, until the desired value is indicated by the display unit 142.

If it is desired to frequency modulate the output signal, a suitable varying control signal is applied to the control input 94 of the oscillator 92, while the phase-locked loop is enabled, so as to frequency modulate $f_m$. The action of the phase-locked loop transfers this frequency modulation directly to $f_o$, and thence to the output frequency (divided if appropriate). Similarly, if it is desired to amplitude modulate the output signal, a suitably varying control signal is applied to the control input 107 of the amplitude modulator 106.

As already mentioned, for fixed values of $f_s$ and $f_m$, only discrete values of $f_o$ are possible. It is to interpolate between these discrete values that $f_s$ is varied by means of the control circuit 51 and by adjustment of RV1.

Thus it can be seen, from equation (2), that there are two lock points for each value of $n$, the frequency separation of the two lock points being $2f_m$. The frequency separation of adjacent lock points for successive values of $n$ is given by $$(n+1)f_s - f_m - (nf_s + f_m) \quad (3)$$

$$= f_s - 2f_m \quad (4)$$

In order for $f_o$ to be continuously variable, with a minimum value for the range of variation, $\pm\Delta f_s$, required in $f_s$, these separations should be equal, which gives $$f_s - 2f_m = 2f_m \quad (5)$$

$$\text{or } f_m = f_s/4 \quad (6)$$

Also, $n\Delta f_s$ should be equal to half the separation, which gives $$\Delta f_s = f_m/n = f_s/4n \quad (7)$$

For the typical values of $f_o$, $f_s$ and $f_m$ already mentioned, the smallest value of $n$ is 128 (corresponding to $f_o$= 256 MHz), which gives $\Delta f_s \approx$4KHz. It can be seen that this variation in $f_s$ represents a very small percentage change in the respective operating frequencies of the oscillators 46, 47, which change can be readily achieved without degrading the performance of the oscillators. In practice the operating frequency of the oscillator 46 is variable over the full range $\pm\Delta f_s$ by means of the control circuit 51, but the operating frequency of the oscillator 47 need only be variable over a smaller range by adjustment of RV1.

To summarise the operation of the apparatus hereinbefore described, to produce an output signal whose frequency has a desired value lying in the range 8 to 512 MHz, the divider circuit 98 is set, by means of the switches 102, to the appropriate one of the six narrower ranges, and the manual adjusting means 14 is then adjusted, with the phase-locked loop disabled, until the display unit 142 indicates a value approximately equal to the desired value. When adjustment of the manual adjusting means is stopped, the phase-locked loop is enabled and the indicator lamp 45*a* comes on, and this may be accompanied by a small change in the frequency value indicated by the display unit 142. The output frequency is then finely adjusted by means of RV1 until the display unit 142 indicates the desired frequency exactly.

Figure 2:
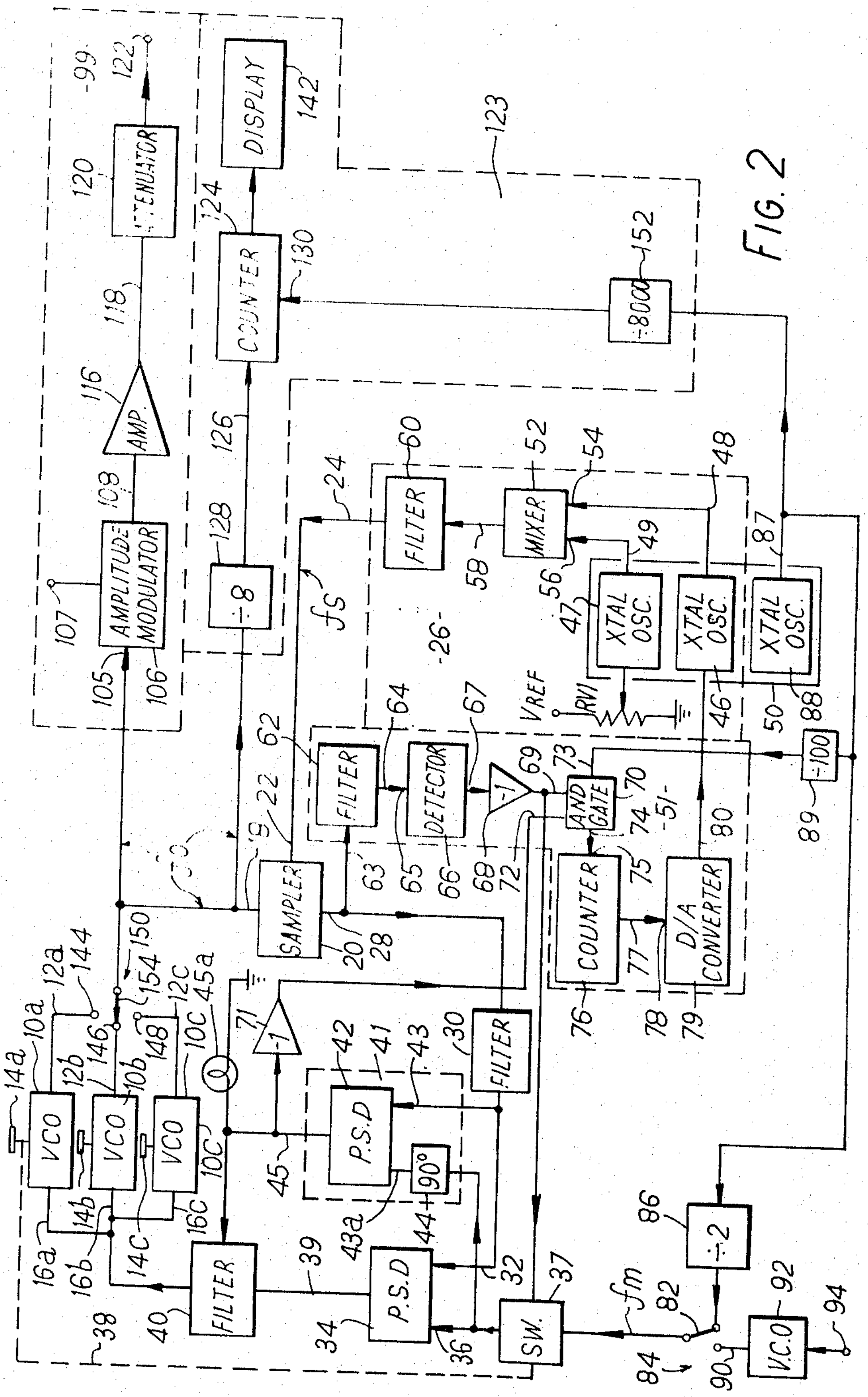

The apparatus shown in FIG. 2 is similar in many respects to the apparatus of FIG. 1, so corresponding parts are given the same reference numerals as were used in FIG. 1, and only the points of difference will be described. The apparatus of FIG. 2 is primarily intended for applications where a more restricted range of output frequencies, e.g. the more common VHF and UHF communications frequencies, will suffice. The oscillator 10 of FIG. 1 is replaced by three voltage-controlled oscillators 10*a*, 10*b*, 10*c*, which are similar to the oscillator 10 of FIG. 1 and which are arranged in parallel with their respective control inputs 16*a*, 16*b*, 16*c* commoned. The oscillators 10*a*, 10*b*, 10*c* have respective manual adjusting means 14*a*, 14*b*, 14*c*, but their respective operating frequency ranges are 450–512 MHz, 108–174 MHz, and 60–88 MHz, and their respective outputs 12*a*, 12*b*, 12*c* are connected to respective contacts 144, 146, 148, of a three-position range selector switch 150.

The desired ranges of output frequencies are directly provided by the oscillators 10*a*, 10*b*, 10*c* in this embodiment of the invention, so the divider circuits 98 and 134 and the filter circuit 12 of FIG. 1 are omitted, and the divide-by-two-hundred-and-fifty circuit 137 is replaced by a divide-by-eight-thousand circuit 152. The wiper 154 of the switch 150 is thus connected to the sampling input 18 of the sampling circuit 20, the input 105 of the amplitude modulator 106 and the input of the divide-by-eight circuit 128. The operation of this embodiment of the invention is otherwise substantially as described with reference to FIG. 1.

If desired, the manual adjusting means 14*a*, 14*b*, 14*c* can be ganged together and operated by a single control knob. Alternatively, the oscillators 10*a*, 10*b*, 10*c* can be constructed as separate plug-in units, only one of which is plugged in at a time: in this case, the switch 50 would be omitted.

The embodiments of the invention hereinbefore described have several advantages. Thus the frequency of the output signal is continuously rather than discretely variable, yet it can be locked throughout its range to the sampling frequency $f_s$ produced by the crystal-controlled oscillators 46, 47, and to the auxilliary frequency $f_m$. The operating frequencies of the oscillators 46, 47 are very accurately controllable and very stable, while the auxilliary frequency $f_m$ is very small compared with the output frequency $f_o$ of the oscillator 10, so that small random fluctuations in $f_m$ have an insignificant effect on $f_o$. Further, the use of the auxilliary frequency $f_m$ reduces the range of variation of the sampling frequency $f_s$ (and thus the range of variation of the oscillators 46, 47) required to make $f_o$, and therefore the frequency of the output signal, continuously variable, and renders frequency modulation of the output signal particularly simple.

It will be appreciated that many modifications may be made to the described embodiments of the invention. For example, the apparatus can be readily modified to generate frequencies in ranges other than those specifically mentioned. Also, the control circuit 51 and the variable resistor RV1 could both be arranged to vary the operating frequency of the same one of the oscillators 46, 47, in which case the operating frequency of the other one of these oscillators could be fixed, and could be used to generate the auxilliary frequency $f_m$, the reference frequency required for the display circuit 123, and the frequency supplied to the counter 76 in the control circuit 51. A further possible modification is to make the counter 76 reversible, and to arrange for it to count up or down in dependence on whether the frequency of the signal at the output 28 of the sampling circuit 20 is greater or less than the auxilliary frequency $f_m$. If it is desired to generate discrete output frequencies only, the sampling frequency source 26 could be constituted by a fixed reference frequency source, e.g. the oscillator 88 along, in which case the possible output frequencies of the oscillator 10 would be given by equation (2). Moreover, the switching device 37 could be independently manually operable, and, in the FIG. 1 embodiment, the switches 102, 139 and the switching means in the filter circuit 112 could be partly implemented by solid state switches.

What is claimed is:

1. Apparatus for generating an electrical output signal of variable frequency, the apparatus comprising: first oscillator means for generating a first frequency from which the output signal is derived; means for varying the first frequency to select approximately a desired value thereof; second oscillator means for generating a second frequency lower than the first frequency; circuit means connected to receive the first and second frequencies and arranged to produce a frequency equal to the difference between the first frequency and a harmonic of the second frequency; phase-sensitive detector means arranged to compare the frequency produced by the circuit means with a third frequency and to produce a control signal dependent upon the difference therebetween; means for applying the control signal to the first oscillator means to vary the first frequency, so as to maintain the frequency produced by the circuit means substantially equal to the third frequency, and thereby phase-lock the first frequency to the second and third frequencies; and means for varying the second frequency to select said desired value of the first frequency, the means for varying the second frequency being arranged to render the first frequency continuously variable and including control means operative, in response to a predetermined difference between the frequency produced by the circuit means and the third frequency, to produce a further control signal which is applied to the second oscillator means to vary the second frequency so as to reduce said difference.

2. Apparatus as claimed in claim 1, wherein the circuit means comprises sampling means arranged to sample the output of the first oscillator means at the second frequency.

3. Apparatus as claimed in claim 1, wherein the control means comprises a source of clock pulses, a counter arranged to receive and count the clock pulses, digital-to-analogue converter means arranged to produce an output signal which is dependent upon the count in the counter and which constitutes said further control signal, and means for preventing the supply of clock pulses to the counter when the difference between the frequency produced by the circuit means and the third frequency is less than said predetermined difference.

4. Apparatus as claimed in claim 3, wherein the means for preventing the supply of clock pulses comprises a band-pass filter whose pass-band includes the third frequency and which is connected to the output of the circuit means, and a detector which is connected to the output of the filter and which is arranged to prevent the supply of clock pulses to the counter when the frequency produced by the circuit means lies within the past-band of the filter.

5. Apparatus as claimed in claim 1, wherein there is provided disabling means for disabling the phase-locked loop which includes the first oscillator means, the circuit means and the phase-sensitive detector means.

6. Apparatus as claimed in claim 5, wherein the disabling means comprises a switching device operatively connected to the means for varying the first frequency and arranged to disable said phase-locked loop while said means for varying the first frequency is in operation.

7. Apparatus as claimed in claim 1, wherein the second oscillator means includes at least one crystal-controlled oscillator.

8. Apparatus as claimed in claim 7, wherein the second oscillator means comprises first and second crystal-controlled oscillators for generating fourth and fifth frequencies respectively, at least one of said fourth and fifth frequencies being variable, and mixing means connected to receive said fourth and fifth frequencies and arranged to produce an output frequency which is equal to the difference between the fourth and fifth frequencies and which constitutes said second frequency.

9. Apparatus as claimed in claim 8, wherein both of said fourth and fifth frequencies are variable, and wherein the control means is operatively connected to one of the crystal-controlled oscillators and the frequency of the other crystal-controlled oscillator is manually variable.

10. Apparatus as claimed in claim 1, wherein the third frequency is lower than the second frequency.

11. Apparatus as claimed in claim 10, wherein the third frequency is substantially equal to one quarter of the second frequency.

12. Apparatus as claimed in claim 1, wherein the first oscillator means comprises at least one voltage- or current-controlled oscillator.

13. Apparatus as claimed in claim 12, wherein the first oscillator means comprises at least one varactor-controlled transmission line oscillator.

14. Apparatus as claimed in claim 1, wherein the first oscillator means comprises a plurality of oscillators having different operating frequency ranges, and means for selecting one of said oscillators to produce the first frequency, the frequency of the output signal being constituted by the first frequency.

15. Apparatus as claimed in claim 1, wherein there is provided adjustable first frequency-dividing means connected to receive and divide the first frequency, the frequency of the output signal being constituted by the frequency produced by the first frequency-dividing means.

16. Apparatus as claimed in claim 1, wherein there is provided means for measuring the frequency of the output signal, which means includes a counter connected to receive pulses at the first frequency and timing means for causing the counter to count the pulses for a predetermined time interval.

17. Apparatus as claimed in claim 16, wherein the timing means comprises means for generating a fixed reference frequency, and second frequency-dividing means connected to receive and divide the fixed reference frequency.

18. Apparatus as claimed in claim 17, wherein the means for generating the fixed reference frequency comprises a third crystal-controlled oscillator.

19. Apparatus as claimed in claim 17, wherein there is provided adjustable first frequency-dividing means connected to receive and divide the first frequency, the frequency of the output signal being constituted by the frequency produced by the first frequency-dividing means, and wherein the second frequency-dividing means is also adjustable, in synchronism with the first frequency-deviding means, whereby said predetermined time interval is inversely proportional to the division ratio of the first frequency-dividing means.

20. Apparatus as claimed in claim 17, wherein the third frequency is produced by frequency-dividing means which is connected to receive and divide said fixed reference frequency.

21. Apparatus as claimed in claim 1, wherein the third frequency is produced by a voltage-controlled oscillator.

22. Apparatus as claimed in claim 21, wherein there is provided means for frequency-modulating the third frequency, whereby to frequency-modulate the output signal.

23. Apparatus as claimed in claim 1, wherein there is provided means for amplitude-modulating the output signal.

* * * * *

UNITED STATES PATENT OFFICE

CERTIFICATE OF CORRECTION

Patent No. 3,775,665 Dated November 27, 1973

Inventor(s) Peter Sample

It is certified that error appears in the above-identified patent and that said Letters Patent are hereby corrected as shown below:

IN THE HEADING:

Insert:

--[30] Foreign Application Data

November 13, 1971 Great Britain...52844/71--.

Signed and sealed this 20th day of May 1975.

(SEAL)
Attest:

RUTH C. MASON
Attesting Officer

C. MARSHALL DANN
Commissioner of Patents
and Trademarks